Feb. 10, 1970  E. V. KHOLODNOV ET AL  3,495,258
MACHINE FOR SPARK DISCHARGE WORKING OF HOLES IN
ELECTRICALLY CONDUCTIVE WORKPIECES
Filed Feb. 20, 1967

United States Patent Office 3,495,258
Patented Feb. 10, 1970

3,495,258
MACHINE FOR SPARK DISCHARGE WORKING OF HOLES IN ELECTRICALLY CONDUCTIVE WORKPIECES
Evgeny Vasilievich Kholodnov, Obl., Fryanovo, ul. Vokzalnaya, 21, kv. 30; Boris Ivanovich Stavitsky, Obl., Fryanovo, ul. Vokzalnaya, 17, kv. 116; Nikolai Vasilievich Lomov, Obl., Fryanovo, ul. Shkolnaya, 1a, kv. 12; and Jury Alexandrovich Shevelev, Obl., Fryanovo, ul. Institutskaya, 17a, kv. 4, all of Moskovskaya, Oblast Fryazino, U.S.S.R.
Filed Feb. 20, 1967, Ser. No. 617,357
Int. Cl. B23k 9/16
U.S. Cl. 219—69         2 Claims

ABSTRACT OF THE DISCLOSURE

A machine for spark discharge working of current-conductive materials by a wire used as the tool electrode, the wire-electrode being moved along a circumferential trajectory by a crank gear having a crank pin rigidly connected to the members guiding the wire-electrode.

---

This invention relates to machines for spark discharge working of holes in workpieces made from current-conductive materials, and more particularly to machines for spark discharge working of holes in workpieces made from current-conductive materials by a non-profiled tool electrode (thin wire).

The invention can be employed most effectively for working holes which are to be positioned with a very high degree of accuracy.

There are known machines for spark discharge working of holes in workpieces made from current-conductive materials by a non-profiled tool electrode (wire), for example, EKCh-1 machine (cf. collection of articles "Electric-Spark Processing of Metals," issue 2, published by the Academy of Sciences of the U.S.S.R, Moscow, 1960, pp. 70–81, FIGS. 7–11).

The known machines comprise: a compound table fashioned as two carriages movable in mutually-perpendicular directions, one of said carriages having a turntable; an appliance for holding the workpiece, said appliance being fastened to one of the carriages of the compound table and movable along a circumference by means of the above-mentioned turntable, as well as in two mutually-perpendicular directions by means of the above-mentioned carriages; and a device for guiding the tool electrode, said device being rigidly secured to the stationary part of the machine.

Thus, in the known machines the circumferential displacement of the work-piece and the tool-electrode is effected due to the rotation of the workpiece alone, while the tool-electrode which is movable in the axial direction does not move in other directions in space.

The known machines of this type may be employed for working holes whose perimeter is made up of a number of lengths of straight lines, as well as for cutting concentric circles or arcs thereof. However, the known machines cannot be employed for cutting more than one round hole in a workpiece without re-positioning the latter in the holding appliance. When more than one round hole is to be cut in the workpiece, the latter has to be re-positioned with the aid of auxiliary appliances varying the position of the workpiece in space so that said workpiece would be capable of turning about the axis of the hole being cut.

Such repeated re-settings of the workpiece fail to ensure a high degree of accuracy of hole positioning, require the employment of special additional devices and involve a great consumption of time.

An object of this invention is to provide a machine for spark discharge working of holes in workpieces made from current-conductive materials which possesses great processing possibilities, in that it insures the working of holes of different diameters without re-positioning the workpiece.

Another object of the invention is to provide a machine of the above-mentioned type which insures the working of holes in workpieces which are positioned with a high degree of accuracy.

Still another important object of the invention is to provide the machine of the above type which is convenient in operation and reliable in service.

In accordance with the above-mentioned and other objects, in the machine according to this invention the appliance for holding the workpiece is rigidly secured to one of the carriages of a compound table, while the other carriage mounts a crank gear whose connecting rod carries a device for guiding the tool-electrode, said gear imparting tool-electrode displacement along a circumference in relation to the workpiece.

The device for guiding the tool electrode is preferably made as a bracket whose ends are provided with guides for the tool-electrode, said bracket being mounted on the connecting rod so that the tool electrode and a crank pin are co-axial.

The object of the present invention is achieved in the most effective way by connecting the crank pin to the crank arm with a sliding connection. The sliding connection of the crank pin to the crank arm is obtained through the use of a slide movable in crank arm guides, said slide carrying the pin rigidly fixed thereon.

The shaft of the crank gear is set in rotation by means of a drive.

This design of the present machine provides the latter with great processing possibilities in spark discharge working of holes, particularly as regards the accurate positioning the latter in workpieces.

Specific features and advantages of this invention will become apparent from the following description of an exemplary embodiment thereof, given with reference to the accompanying drawing in which.

Figure 1:
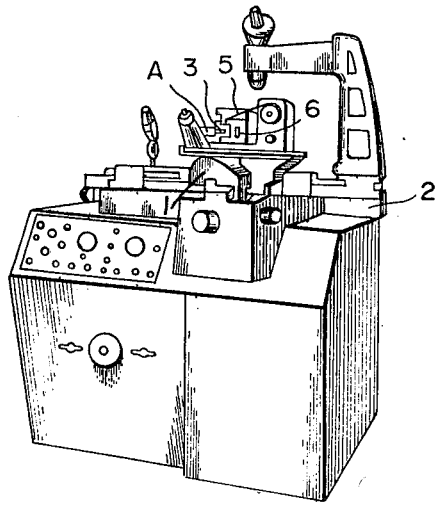
FIG. 1 is a general perspective view of the machine according to the invention.
Figure 2:
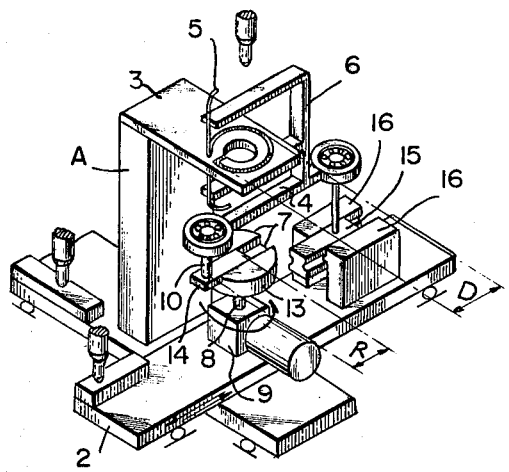
FIG. 2 is a perspective view of a compound table with an appliance for holding the workpiece and a device for guilding the tool electrode.

The machine for spark discharge working of holes in workpieces made from current-conductive materials by a non-profiled tool-electrode, according to this invention, comprises a compound table incorporating two carriages, namely, a transverse carriage 1 (FIGS. 1 and 2) and a longitudinal carriage 2 which move in mutually-perpendicular directions; an appliance A for holding a workpiece 3, said appliance being rigidly fixed to the transverse carriage 1; a crank gear with a connecting rod 4, and a device for guiding the tool-electrode 5 fashioned as a bracket 6 fastened to the connecting rod 4.

The connecting rod 4, with the aid of a crank 7 whose shaft 8 is set in rotation by means of a drive 9, sets the tool-electrode 5 in motion along a circle in the workpiece 3, the opposite end of connecting rod 4 being connected to a slide 15 which is adjustable in guides 16 secured to carriage 2. The bracket 6 is attached to the connecting rod 4 so that the tool-electrode 5 and a pin 10 are co-axial. The co-axial arrangement of said electrode and said pin is obtained by mounting the bracket 6 on the connecting rod 4 with the possibility of moving along said connecting rod 4, with a subsequent rigid fixation of the bracket. Owing to this arrangement, holes of preset size can be cut in the workpiece.

Figure 3:
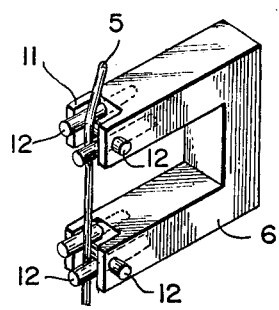
FIG. 3 is a perspective view on enlarged scale of cylindrical rollers serving as guides for the tool electrode.

The ends 11 of the bracket 6 (FIG. 3) are provided with guides for the tool-electrode 5. The guides are fashioned as cylindrical rollers 12 made from ceramic material possessing high wear resistance.

To provide for the cutting of holes of various diameters in workpieces, the pin 10 (FIG. 2) of the connecting rod 4 is connected to rotatable disc 13 with a sliding connection. This sliding connection is obtained through the use of a slide 14 which carries the pin 10 rigidly fixed thereon. The slide 14 can be moved in the guides of the disc 13 by means of a screw pair (not shown in the drawing).

Other units of the machine, such as the source of power supply, pulse generator, coordinate counters, the systems insuring the movement and tensioning of the tool-electrode (wire), the drives providing the movement of the compound table carriages and of the device for guiding the tool electrode along a circumference, and the inter-electrode medium circulation system are not described herein in order not to obscure the essence of the invention, especially as they can be constructed to the patterns known to those skilled in the art.

The working of accurately-positioned holes in workpieces is performed by the machine of the invention in the following way.

With the aid of the screw pair and slide 14 (FIG. 2) a precise length of the radius of the crank 7 is set, said length corresponding to the radius of the hole being processed.

The workpiece 3 is secured in the holding appliance A.

The tool-electrode 5 (wire) moving in the axial direction with a constant speed is fitted into a pilot hole preformed in the workpiece 3.

Constant tension of the tool electrode 5 is ensured by one of the methods known to those skilled in the art (for example, by means of an electric motor operated with braking).

By means of appropriate counters constructed in accordance with one of the known types and intended for controlling the position of the two carriages 1 and 2 in the system of coordinates of the compound table, the axis of the tool-electrode 5 is aligned with the center of the hole under processing.

The crank gear is placed in the initial position in which the axis of its connecting rod 4 carrying the bracket 6 for guiding the tool electrode 5 and the axis of the slide 14 of the crank 7 are brought in line.

Further (after switching on the supply from the pulse generator and immersing the tool electrode 5 with the workpiece 3 in the liquid inter-electrode medium), using the drive (not shown in the drawing) of the longitudinal carriage 2, a slot is cut in the workpiece 3 by means of the tool electrode 5, the length of said slot being such as to position the electrode 5 at a distance equal to one-half of the diameter of the hole as measured from the center of the hole.

Next, after discontinuing the feed of the longitudinal carriage 2 which has already reached the desired position in the system of coordinates, the tool-electrode 5, by means of the crank gear actuated by the drive 9, is set in motion along the circumference of the hole of a preset diameter relative to the workpiece, thus (working) cutting the hole of a preset diameter in the workpiece.

The hole of a preset size is processed (cut) in the workpiece 3 in the course of one turn of the crank 7 of the crank gear.

After cutting the first hole, the tool electrode 5 (wire) should be cut off.

In order to cut the next hole, the device for guiding the tool electrode 5 is shifted in relation to the workpiece 3 to a distance equal to the spacing of the holes to be cut, after which the working cycle is repeated.

What is claimed is:

1. A machine for spark discharge cutting of holes in workpieces made from current-conductive materials by a non-profiled tool-electrode, said machine comprising: a compound table including two carriages movable in mutually-perpendicular direction; an appliance for holding a workpiece, said appliance being rigidly connected to one of the carriages of the compound table; a crank gear mounted on the other carriage of said compound table and including a rotatable member, an adjustable slide member supported in the rotatable member for rotation therewith, and a connecting arm secured to said slide member and slidably connected to said other carriage; and a device for guiding the tool-electrode mounted on the connecting rod of said crank gear, the latter driving said tool-electrode in motion along the circumference of the hole to be cut in the workpiece.

2. A machine as claimed in claim 1 in which the device for guiding the tool-electrode comprises a bracket having ends provided with guides for the tool-electrode, said crank gear including a pin connected to said slide member and said connecting rod, said bracket being attached to the connected rod of the crank gear so that said tool-electrode and said pin are co-axial.

References Cited

UNITED STATES PATENTS 2,773,968  12/1956  Martellotti et al.

FOREIGN PATENTS 824,001  11/1959  Great Britain.

JOSEPH V. TRUHE, Primary Examiner

R. F. STAUBLY, Assistant Examiner